US010290128B2

United States Patent
Liu et al.

(10) Patent No.: US 10,290,128 B2
(45) Date of Patent: May 14, 2019

(54) INTERACTIVE SCENE GRAPH MANIPULATION FOR VISUALIZATION AUTHORING

(71) Applicant: Adobe Inc., San Jose, CA (US)

(72) Inventors: Zhicheng Liu, Redwood City, CA (US); Wilmot Wei-Mau Li, San Francisco, CA (US); Alan G. Wilson, Cedar Hills, UT (US); Lubomira A. Dontcheva, San Francisco, CA (US); Jovan Popovic, Seattle, WA (US)

(73) Assignee: Adobe Inc., San Jose, CA (US)

( * ) Notice: Subject to any disclaimer, the term of this patent is extended or adjusted under 35 U.S.C. 154(b) by 88 days.

(21) Appl. No.: 14/937,683

(22) Filed: Nov. 10, 2015

(65) Prior Publication Data
US 2017/0132814 A1 May 11, 2017

(51) Int. Cl.
*G06T 11/20* (2006.01)
*G06F 9/451* (2018.01)
*G06F 17/30* (2006.01)

(52) U.S. Cl.
CPC .......... *G06T 11/206* (2013.01); *G06F 9/451* (2018.02); *G06F 17/30* (2013.01); *G06F 17/30817* (2013.01); *G06T 2200/24* (2013.01)

(58) Field of Classification Search
CPC .. G06T 11/206; G06T 2200/24; G06F 3/0484
USPC ........................................................ 345/440
See application file for complete search history.

(56) References Cited

U.S. PATENT DOCUMENTS

| | | | | |
|---|---|---|---|---|
| 2002/0059293 | A1* | 5/2002 | Hirsch | G06F 17/30607 |
| 2004/0189645 | A1* | 9/2004 | Beda | G06F 8/38 |
| | | | | 345/473 |
| 2006/0206512 | A1* | 9/2006 | Hanrahan | G06F 17/30554 |
| 2008/0005161 | A1* | 1/2008 | Grealish | H04L 41/0233 |
| 2008/0244404 | A1* | 10/2008 | Li | G06F 8/61 |
| | | | | 715/713 |
| 2010/0088619 | A1* | 4/2010 | Rath | G06F 8/38 |
| | | | | 715/764 |

(Continued)

OTHER PUBLICATIONS

Meixner, Britta, "Towards an Easy to Use Authoring Tool for Interactive Non-Linear Video", Sep. 1, 2012, SpringerLink, pp. 1251-1276, [retrieved on May 7, 2018] Retrieved from the Internet <URL:https://link.springer.com/article/10.1007/s11042-012-1218-6>.*

(Continued)

*Primary Examiner* — Barry Drennan
*Assistant Examiner* — Terrell M Robinson
(74) *Attorney, Agent, or Firm* — Wolfe-SBMC

(57) ABSTRACT

Techniques for interactive scene graph manipulation for visualization authoring are described. In implementations, visual marks are grouped into containers. Each container includes layout settings independent of other containers, and the layout settings are individually adjustable. The visual marks are configured to represent data values. Additionally, the containers are nested in a hierarchy. Then, data visualizations are constructed for display via a user interface of a display device. For example, the data visualizations can be constructed by applying data values to the visual marks and layout settings of the containers to the visual marks grouped within the nested containers to generate the data visualizations.

20 Claims, 11 Drawing Sheets

(56) References Cited

U.S. PATENT DOCUMENTS

| | | | |
|---|---|---|---|
| 2010/0162152 A1* | 6/2010 | Allyn | G06F 3/0481 715/767 |
| 2011/0184995 A1* | 7/2011 | Cardno | G06F 17/30554 707/805 |
| 2014/0351731 A1* | 11/2014 | Claycomb | G06F 3/0482 715/769 |
| 2015/0012818 A1* | 1/2015 | Reichmann | G06F 17/2247 715/236 |

OTHER PUBLICATIONS

Maloney, J., "The scratch programming language and environment" ACM Trans. Comput. Educ. 10, 4, Article 16 (Nov. 2010), 15 pages. [Retrieved on Dec. 5, 2018], Retrieved from the Internet <URL:https://dl.acm.org/citation.cfm?id=1868363> (Year: 2010).*

Zgraggen, Emanuel, "PanoramicData: Data Analysis through Pen & Touch", IEEE Transactions on Visualization and Computer Graphics (Dec. 2014), vol. 20, pp. 2112-2121 [Retrieved on Dec. 5, 2018], Retrieved from the Internet <URL:https://ieeexplore.ieee.org/abstract/document/6876039> (Year: 2014).*

"Datlyon: Illustrator plug-in to create web-based charts", http://datylon.com/products/—Retrieved on Aug. 27, 2015, 5 pages.

"Eagereyes", http://www.eagereyes.org—Retrieved on Aug. 27, 2015, 8 pages.

"Google Charts", https://developers.google.com/chart/—Retrieved on Aug. 27, 2015, 3 pages.

"Information Aesthetics", http://infosthetics.com/—Retrieved on Aug. 27, 2015, 5 pages.

"Tableau Software", http://www.tableausoftware.com—Retrieved on Aug. 27, 2015, 2 pages.

"Vega: A Visualization Grammar", http://trifacta.github.io/vega/—Retrieved on Aug. 27, 2015, 1 page.

Bigelow,"Reflections on How Designers Design With Data", In Proceedings of the 2014 International Working Conference on Advanced Visual Interfaces, 2014, 8 pages.

Bostock,"D3: Data-Driven Documents", IEEE Transactions Visualization and Computer Graphics, 2011, 9 pages.

Cairo,"The Functional Art: An introduction to information graphics and visualization", New Riders, 1st edition, Sep. 2012, 72 pages.

Chevalier,"Using Concrete Scales: A Practical Framework for Effective Visual Depiction of Complex Measures", IEEE Transactions on Visualization and Computer Graphics, 2013, 11 pages.

Heer,"Generalized Selection via Interactive Query Relaxation", In Proceedings of the SIGCHI Conference on Human Factors in Computing Systems, 2008, 10 pages.

Heer,"prefuse: a toolkit for interactive information visualization", In Proceedings of the SIGCHI conference on Human factors in computing systems, 2005, 10 pages.

Hottelier,"Programming by Manipulation for Layout", In Proceedings of the 27th annual ACM symposium on User interface software and technology, Aug. 25, 2014, 13 pages.

Kandel,"Wrangler: Interactive Visual Specification of Data Transformation Scripts", In Proceedings of the SIGCHI Conference on Human Factors in Computing Systems, CHI '11,, May 2011, 10 pages.

Lakoff,"Women, Fire, and Dangerous Things", University of Chicago Press, Chicago, 1 edition, Apr. 1990, 631 pages.

Liu,"Network-based Visual Analysis of Tabular Data", In Visual Analytics Science and Technology (VAST), 2011, 10 pages.

Liu,"Ploceus: Modeling, visualizing, and analyzing tabular data as networks", Information Visualization, 13(1):59-89, 2014, 31 pages.

Mackinlay,"Show Me: Automatic Presentation for Visual Analysis", IEEE Transactions on Visualization and Computer Graphics, 13(6), Dec. 2007, 8 pages.

North,"Visualization Schemas and a Web-based Architecture for Custom Multiple-View Visualization of Multiple-Table Databases", Information Visualization, 1(3-4):211-228, 2002, 30 pages.

Pousman,"Casual Information Visualization: Depictions of Data in Everyday Life", IEEE Transactions on Visualization and Computer Graphics,, Nov. 2007, 8 pages.

Reinert,"Interactive By-example Design of Artistic Packing Layouts", ACM Trans. Graph., 32(6):218:1-218:7,, Nov. 2013, 7 pages.

Ren,"iVisDesigner: Expressive Interactive Design of Information Visualizations", IEEE Transactions on Visualization and Computer Graphics, Dec. 2014, pp. 2092-2101.

Roth,"Interactive Graphic Design Using Automatic Presentation Knowledge", CHI '94 Proceedings of the SIGCHI Conference on Human Factors in Computing Systems, Apr. 1994, 6 pages.

Satyanarayan,"Lyra: An Interactive Visualization Design Environment", In Computer Graphics Forum, vol. 33, 2014, 10 pages.

Stolte,"Polaris: A System for Query, Analysis and Visualization of Multi-dimensional Relational Databases", IEEE Transactions on Visualization and Computer Graphics 2002,, 10 pages.

Victor,"Additional Notes on Drawing Dynamic Visualizations", http://worrydream.com/#!/DrawingDynamicVisualizationsTalkAddendum, May 21, 2013, 10 pages.

Wickham,"Elegant graphics for data analysis", Springer, New York, 1st ed. 2009. corr. 3rd printing 2010 edition, Aug. 2009. [33] L. Wilkinson., 2009, 217 pages.

Wilkinson,"The Grammar of Graphics", Springer-Verlag, New York, 2005., Jan. 2007, 7 pages.

Xiong,"PeopleGarden: Creating Data Portraits for Users", In Proceedings of the 12th Annual ACM Symposium on User Interface Software and Technology, New York, NY, USA,, 1999, pp. 37-44.

* cited by examiner

INTERACTIVE SCENE GRAPH MANIPULATION FOR VISUALIZATION AUTHORING

BACKGROUND

Visualization authoring is a technique for representing data as images that can aid in understanding various attributes of the data. Generally, visualization authoring is based on manipulating an underlying scene graph. A scene graph, for instance, represents a data structure that organizes displayable visual objects in a hierarchy and records object information, such as spatial groupings and visual attributes. For web-based visualizations, conventional techniques typically leverage a document object model (DOM) for scene graph implementation, but the DOM is generally not accessible to average users (e.g., non-programmers). Thus, many users cannot leverage the DOM to manipulate the scene graph and author visualizations.

In some instances, predefined templates are provided to users to more easily create visualizations, but these templates generally do not support visualizations that do not fit into specified typologies of the templates. Thus, users cannot generate creative visualizations that are not supported by the templates, but are limited to prescribed designs of the templates. Because of these limitations in the conventional techniques, scene graph manipulation remains challenging for the average users.

SUMMARY

Techniques for interactive scene graph manipulation for visualization authoring are described. These techniques provide a framework that allows non-programmers to manipulate arbitrary scene graphs and create visualizations that do not fit within specified typologies of predefined templates, all without writing program code. This is accomplished by grouping visual marks into containers, and each container includes layout settings independent of other containers. In addition, the layout settings of each container are individually adjustable. In an example, each container includes its own layout settings for layout of the visual marks. Further, each container is nested in a hierarchy with the other containers to create a nested container model describing the grouping of the visual marks. Then, the visual marks are used to construct data visualizations for display via a user interface on a display device. For example, the data visualizations can be constructed by applying data values to the visual marks and layout settings of nested containers to the visual marks grouped within the nested containers to generate the data visualizations.

In implementations, a user interface implemented by a computing device includes a data view panel, a canvas panel, and a properties panel. In at least one approach, the data view panel can display sets of data. In addition, the canvas panel can display visual marks during construction of visualizations. In implementations, these visual marks can represent the sets of data, and the visual marks can be associated with containers that are nested in a hierarchical structure. Each container can include associated layout settings for displaying visual marks grouped within the container. Additionally, the properties panel can display visual property settings of visual marks displayed in the canvas panel, in addition to the layout settings of containers associated with the visual marks. The properties panel can also enable a user to reconfigure the visualizations displayed in the canvas panel by modifying the visual property settings and the layout settings displayed in the properties panel. In implementations, the disclosed techniques include associating the visual property settings with the sets of data to cause the visual marks to visually represent data values in the sets of data using at least one visual characteristic, such as height, width, color, and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
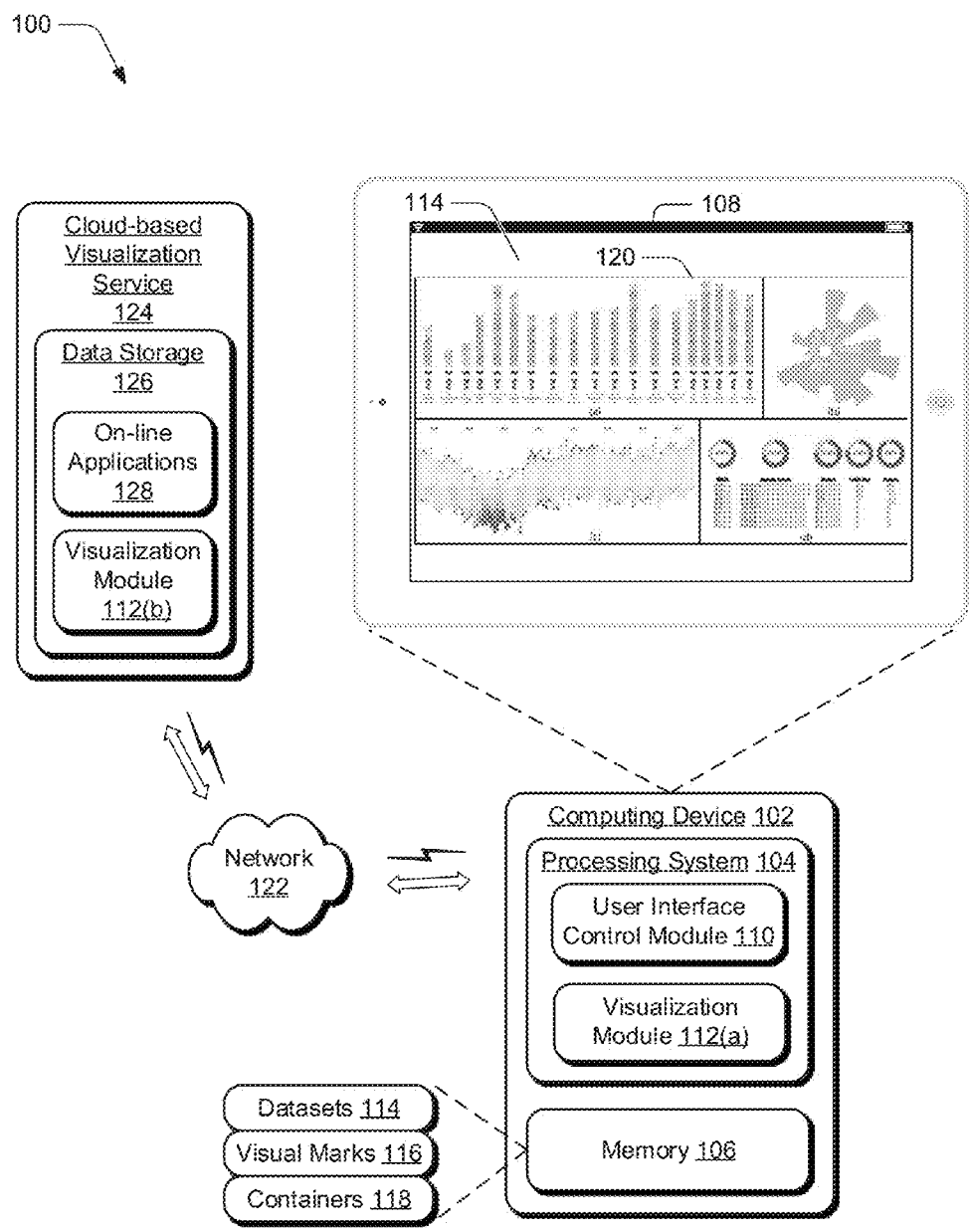
FIG. 1 is an illustration of an environment in an example implementation that is operable to implement the techniques for interactive scene graph manipulation for visualization authoring described herein.

Conventional techniques for visualization authoring can be inefficient, overly complicated, and can have limited flexibility. For instance, template-based approaches (e.g., high-level descriptions of conventional chart types that generate charts automatically given a dataset) typically do not support visualizations that do not fit into specified typologies defined for the templates. Further, manipulation of chart attributes for standard chart types can require changing the implementation and toolkit design if a particular attribute is not parameterized. In addition, grammar-based approaches, such as formal specifications (e.g., concise grammatical representations of data visualizations), lack the flexibility required to handle nested layouts or International System of Typographic Picture Education (ISOTYPE) representations found in casual information visualizations ("infovis"). These inefficiencies and complications can result in a poor user experience, particularly for users who are non-programmers.

In contrast, techniques described herein provide a framework for scene graph manipulation that enables visualization authoring without requiring a user to write program code. In particular, the framework utilizes a nested container model to describe a grouping of visual marks (e.g., primitive shapes) with annotations representing relationships between the visual marks. While conventional techniques use high-level languages to compress the scene graph and describe rules of visual mapping, the framework described herein does not perform any compression on the scene graph, but instead preserves a complete scene graph in the nested container model by augmenting the scene graph with annotations of item grouping (in the form of containers) and item semantics (e.g., scope and object).

As used herein, the terms "item" and "visual item" refer to an object that is displayable via a display device, and items can include visual marks and visual representations of containers. As used herein, the term "visual mark" can refer to any of a variety of objects, such as primitive shapes (e.g., boxes, cones, cylinders, spheres, ellipses, triangles, pyramids, and so on), or complex shapes (e.g., animals, vehicles, faces, tennis rackets, persons, and so on). Accordingly, the term visual mark can refer to any of a variety of objects displayable via the display device.

In addition, the term "container" refers to a collection of data contained in a data structure. For example, the container represents a node in the data structure. In implementations, a container encapsulates groups of visual items with layout information such as layout settings. Each container, for instance, includes its own layout settings independent of other containers, and the layout settings are individually adjustable. Further, each container includes various annotations that jointly determine data values to be used in item creation and visual attribute binding, a discussion of which is provided below in more detail. In addition, representations of the containers can be displayed via the display device during construction of the visualizations to help a user to better understand the hierarchy of the nested containers and provide a visual representation of the underlying structure of the data visualizations The techniques also utilize interactive operators, such as select, populate, duplicate, and filter, to enable interactive manipulation of the scene graph structure. For example, the interactive operators create and remove items in the scene graph based on relationships of items defined by the nested container model. Also, a user interface allows a user to directly manipulate displayed visualizations without being required to write program code.

Techniques described herein reduce a number and complexity of user interactions required to generate and manipulate data visualizations. These techniques also enable complex grouping with nested containers, flexible and modular layout management, and customizable design with item-level control, all without requiring a user to write program code. For example, visual items having their own margin, padding, and layout information can enable complex grouping. In addition, by combining layouts that are data-independent (e.g., circular layout, flow layout, and so forth) in a nested container structure, complex layouts are enabled that would be difficult to specify and interpret in traditional grammar-based approaches. Also, because a layout of each container in a scene graph functions independently of the other containers, new layouts can be easily plugged into the framework. Additionally, tracking each item's information, such as margin, padding, and size, allows a user to apply item-specific customization, which is difficult to achieve in traditional grammar-based systems.

Scene graphs are generally used by vector-based graphics editing applications. This is not to be construed as limiting, however, and implementations discussed herein may be employed across a wide variety of different graphics formats and protocols. In addition, a scene graph can include a collection of nodes in a graph or tree structure. The nodes are referred to herein as containers and visual marks, both of which are described in further detail below.

As used herein, the term "application" may refer to computer software that causes a computer to perform useful tasks. Some examples of applications can include a software application, an application program, a mobile app, a desktop application, and so on. Additional examples of applications include web browsers, email programs, word processors, games, utilities, social networking applications, instant messaging applications, and so on. In at least some embodiments, an application may represent a service that is accessible over a network, such as a cloud-based service, a distributed application, and so forth. Thus, an application is not limited to functionalities installed locally on a client device. Further examples of the above-described terms may be found in relation to the following discussion.

In the following discussion, an example environment is first described that may employ the techniques described herein. Following this, example implementations are described that employ the techniques described herein. Example procedures are then described which may be performed in the example environment as well as other environments. Consequently, performance of the example procedures is not limited to the example environment and the example environment is not limited to performance of the example procedures. Finally, an example system and device are described that are operable to use the techniques discussed herein in accordance with one or more embodiments.

Example Environment

FIG. 1 is an illustration of an environment 100 in an example implementation that is operable to utilize techniques usable for interactive scene graph manipulation for visualization authoring. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Additionally, although a single computing device 102 is shown, the computing device 102 may be representative of a plurality of different devices, such as multiple servers utilized by a business to perform operations "over the cloud" as further described in relation to FIG. 11.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a user interface control module 110 and a visualization module 112(a), all of which are storable in the memory 106 and as such are implemented at least partially in hardware. The user interface control module 110 and the visualization module 112(a) are executable by the processing system 104 to cause performance of one or more operations. Other implementations are also contemplated, such as implementation as dedicated hardware components, e.g., application specific integrated circuit, fixed-logic circuitry, and so forth.

The user interface control module 110 is representative of functionality of the computing device 102 to generate and manage interaction with a user interface 114 displayed by the display device 108. For example, a user may use a keyboard, cursor control device, gesture detected by touchscreen functionality of the display device 108, verbal utterance, and so on to interact with text or other objects displayed by the display device 108. The displayed objects can include a variety of different objects, such as text, shapes or other visual objects, and so on.

The visualization module 112(a) is representative of functionality of the computing device 102 to manage creation and manipulation of visualizations such as infographics. For example, the visualization module 112(a) can utilize data in the memory 106, such as datasets 114, visual marks 116, and containers 118 to generate one or more visualizations, such as example visualizations 120, for display via the display device 108. Additionally, the visualization module 112(a) is configured to function in conjunction with the user interface control module 110 to allow a user to manipulate the visualizations directly via the user interface 114 without being required to program code.

The environment 100 is also illustrated as including a network 122 via which the computing device 102 can communicate with other connected entities, such as one or more additional computing devices, servers, and so forth. Although the network 122 is illustrated as the Internet, the network may assume a wide variety of configurations. For example, the network 122 may include a wide area network (WAN), a local area network (LAN), a wireless network, a public telephone network, an intranet, and so on. Further, although a single network 122 is shown, the network 122 may be representative of multiple networks.

The environment 100 also includes a cloud-based visualization service 124, such as a web application that is accessible by client devices, e.g., the computing device 102. The visualization service 124 includes data storage 126 that may be implemented as any suitable memory, memory device, or electronic data storage for network-based data storage. The data storage 126 further maintains a visualization module 112(b) representing an instance of the visualization module 112(a), as well as on-line applications 128 (e.g., network-based applications). In at least some implementations, the visualization module 112(b) and the on-line applications 128 are accessible by the computing device 102.

The cloud-based visualization service 124 can also be implemented with server devices that are representative of one or multiple hardware server devices of the visualization service 124. Further, the cloud-based visualization service 124 can be implemented with various components, such as a processing system and memory, as well as with any number and combination of differing components as further described with reference to the example device shown in FIG. 11 to implement the services, applications, servers, and other features of interactive scene graph manipulation for visualization authoring.

Example Implementations

The following discussion describes example implementations of interactive scene graph manipulation for visualization authoring that can be employed to perform various aspects of techniques discussed herein. The example implementations may be employed in the environment 100 of FIG. 1, the system 1100 of FIG. 11, and/or any other suitable environment.

Figure 2:
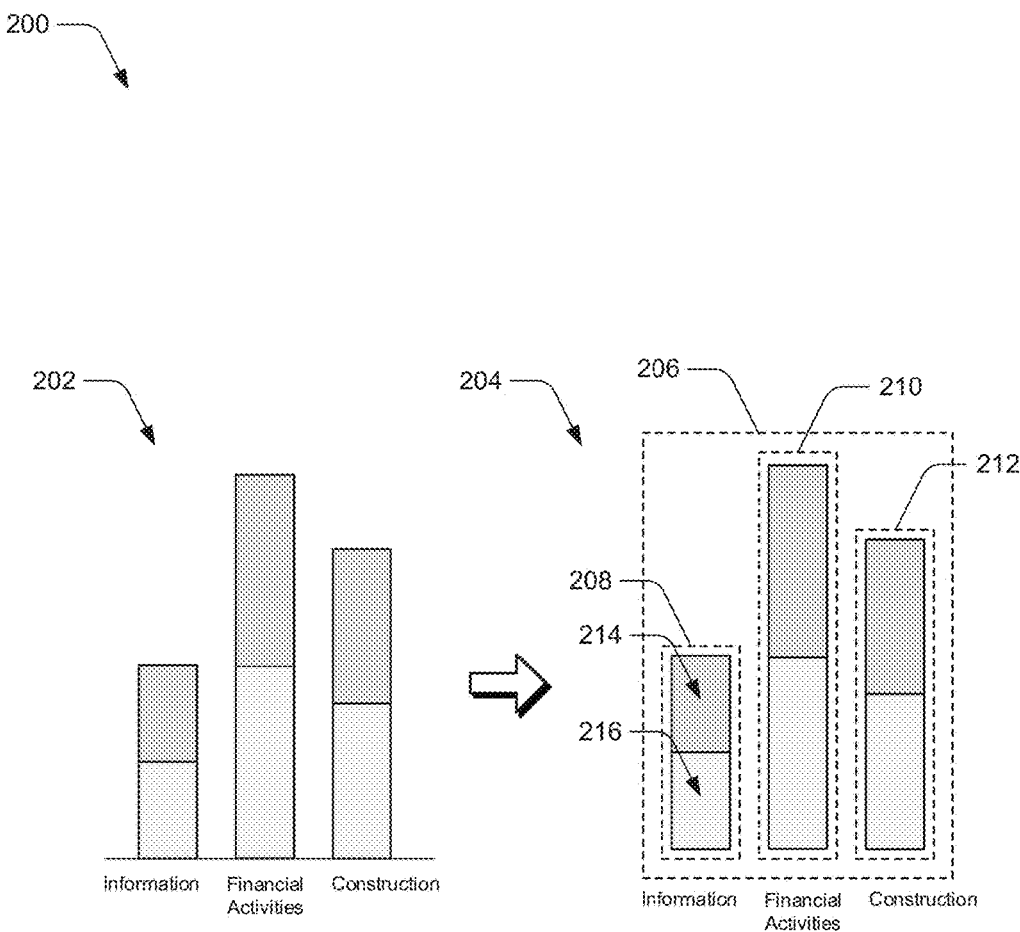
FIG. 2 depicts an example implementation that is operable to utilize techniques for interactive scene graph manipulation for visualization authoring.

FIG. 2 depicts an example implementation 200 that is operable to utilize techniques for interactive scene graph manipulation for visualization authoring. The example implementation 200 illustrates a visualization 202 of a stacked bar chart representing example data from Table 1 below:

TABLE 1

Dataset representing jobs in different sectors over a two year period

| Column Name | Column Type | Column Values |
|---|---|---|
| Sector | Categorical | ["Information", "Financial Activities", "Construction", "Federal Government", . . . ] |
| Year | Ordinal | [2013-2014] |
| Month-Year | Ordinal | [January 2013-December 2014] |
| Jobs | Quantitative | Number of jobs (millions) in each sector by month-year |
| Change % | Quantitative | Percentage of job change |

The visualization 202 includes bars with colors and height that represent data values from Table 1 (for simplicity, only three stacked bars are shown). For example, each bar represents a Sector, each color (e.g., different shade) represents a different Year, and the height of each bar represents Jobs. Assume, for example, that a user now wishes to change the shape of the bars to circles and then duplicate the circles such that the number of copies represents the number of jobs in millions. Conventional techniques do not support this type of operation because the shape and cardinality of visual marks (e.g., bars) are generally not implemented inside a template or grammatical specification used to generate data visualizations.

In contrast to these conventional techniques, the framework described herein can be used to implement a nested container model to describe the grouping of visual marks. For instance, the stacked bar chart 202 can be re-represented under this framework as visualization 204. In the visualization 204, the bars are enclosed by representations of containers (illustrated as dotted lines), such as an exterior container representation 206 and container representations 208-212. These containers are collections of data contained in a data structure. In implementations, the containers encapsulate groups of visual marks with layout information, and each container includes its own layout settings. Note that the container representations 208-212 are located inside the exterior container representation 206. This indicates that the container representations 208-212 are children of the exterior container representation 206. In addition, each of the container representations 208-212 includes a visual mark (e.g., stacked bar) displayed within respective container representations. For example, container representation 208 includes a stacked bar having two rectangles 214 and 216. Similar stacked bars are displayed within the container representations 210 and 212, and thus the stacked bars are children of the container representations 210 and 212, respectively. The underlying structure of the visualization 204 is described in detail with respect to FIG. 3.

Figure 3:
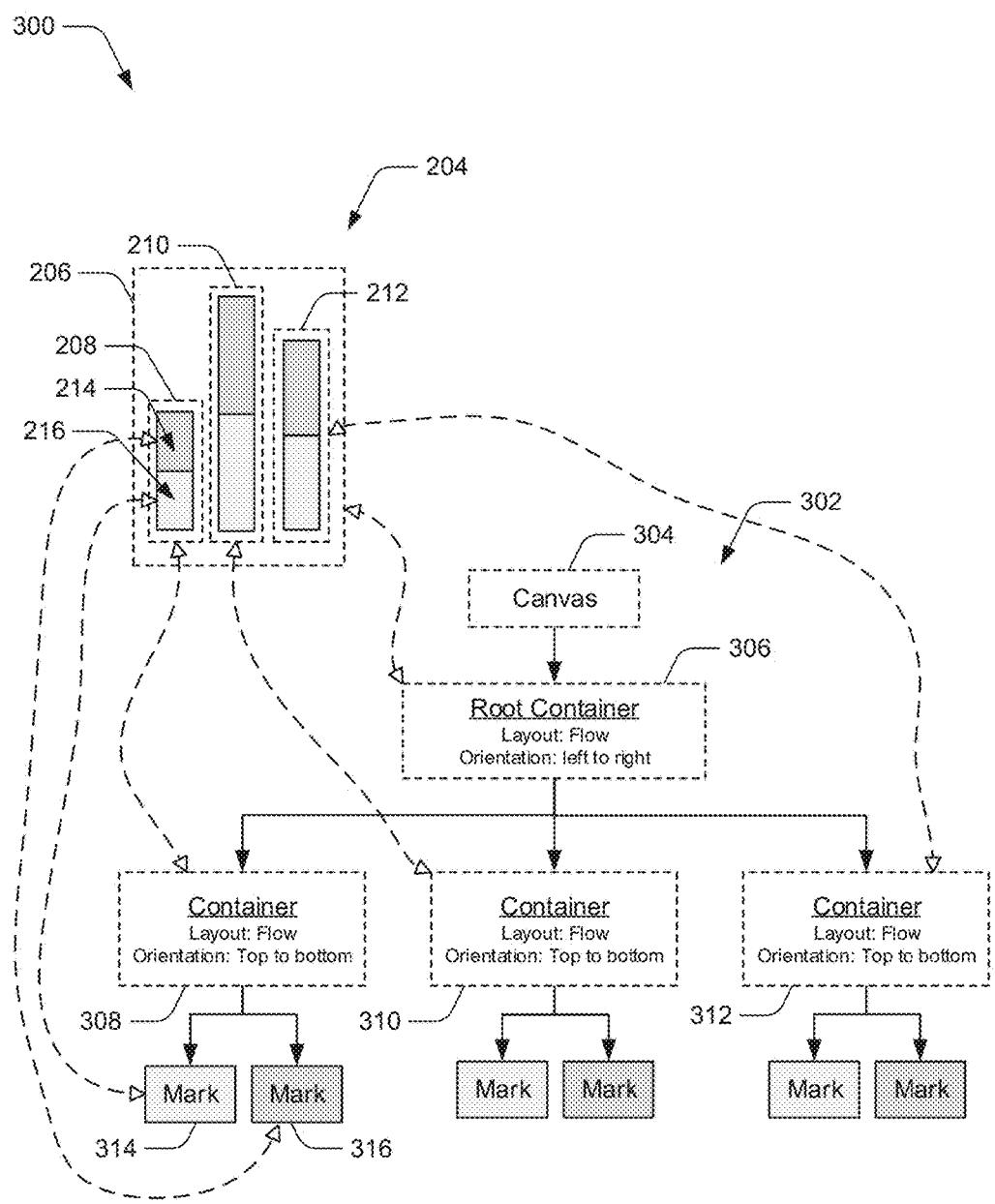
FIG. 3 depicts an example implementation that illustrates a scene graph representing a framework used to organize visual marks in a visualization from FIG. 2.

FIG. 3 depicts an example implementation 300 that illustrates a scene graph 302 representing a framework used to organize the visual marks in the visualization 204 from FIG. 2. In implementations, the scene graph 302 includes visual marks that are leaf nodes in the scene graph 302, and containers that may or may not have children. Each child of a container can be a container or a visual mark. This allows the containers to be nested. In implementations, visual marks and containers each include associated visual properties to be applied to respective visual marks and visual representations of the containers. Some example visual properties include: width, height, shape, fill, margin (e.g., space between the visual mark or container and its neighbors), and so on. In addition, a container can include other properties, such as padding properties (e.g., space around the containers content) and layout settings. Depending on the shape of a visual mark, additional visual properties may be applicable. For example, a circle mark can include a radius property, and a text mark can include properties such as font family and font weight. These visual properties and other properties are adjustable independently from other containers and/or other visual marks.

In the illustrated example, the scene graph 302 includes a canvas 304 representing a background or bottom layer of a display. In addition, the scene graph 302 includes a top-level root container 306 represented by the exterior container representation 206 of the visualization 204. In this example, the root container 306 has three children: containers 308-312 corresponding to the container representations 208-212, respectively, in the visualization 204. In implementations, positions of the containers are determined by parent container layout settings. For example, the positions of the containers 308-312 are determined by the layout settings of the root container 306, such as flow layout with orientation left to right.

The container layout settings can include a variety of types, such as flow, grid, circle, scatter, and so on. In implementations, each layout can include parameters unique to that layout. For example, flow layout can include parameters such as orientation (e.g., left to right, top to bottom, and so on), horizontal gap, vertical gap, horizontal alignment (e.g., left, center, right), vertical alignment (e.g., top, middle, bottom), and so on. In addition, a circle layout can include various parameters such as inner radius, start angle, end angle, orientation (e.g., clockwise, anti-clockwise), gap, and so on. Any of these settings can be modified by a user via a user interface, such as user interface 114 from FIG. 1.

The scene graph 302 also illustrates child visual marks (e.g., rectangles) for each of the containers 308-312. For example, container 308 has two children: marks 314 and 316 corresponding to rectangles 214 and 216 in the visualization 204. In addition, the flow layout associated with the containers 308-312 includes an orientation top to bottom. Although the containers 308-312 are illustrated as having substantially similar layout and orientation, the layout settings of each container are independent of the other containers. In the illustrated example, the layout settings of the container 308 cause the child marks 314 and 316 to be positioned in a top to bottom orientation, such as is illustrated in the visualization 204 by rectangles 214 and 216.

Figure 4:
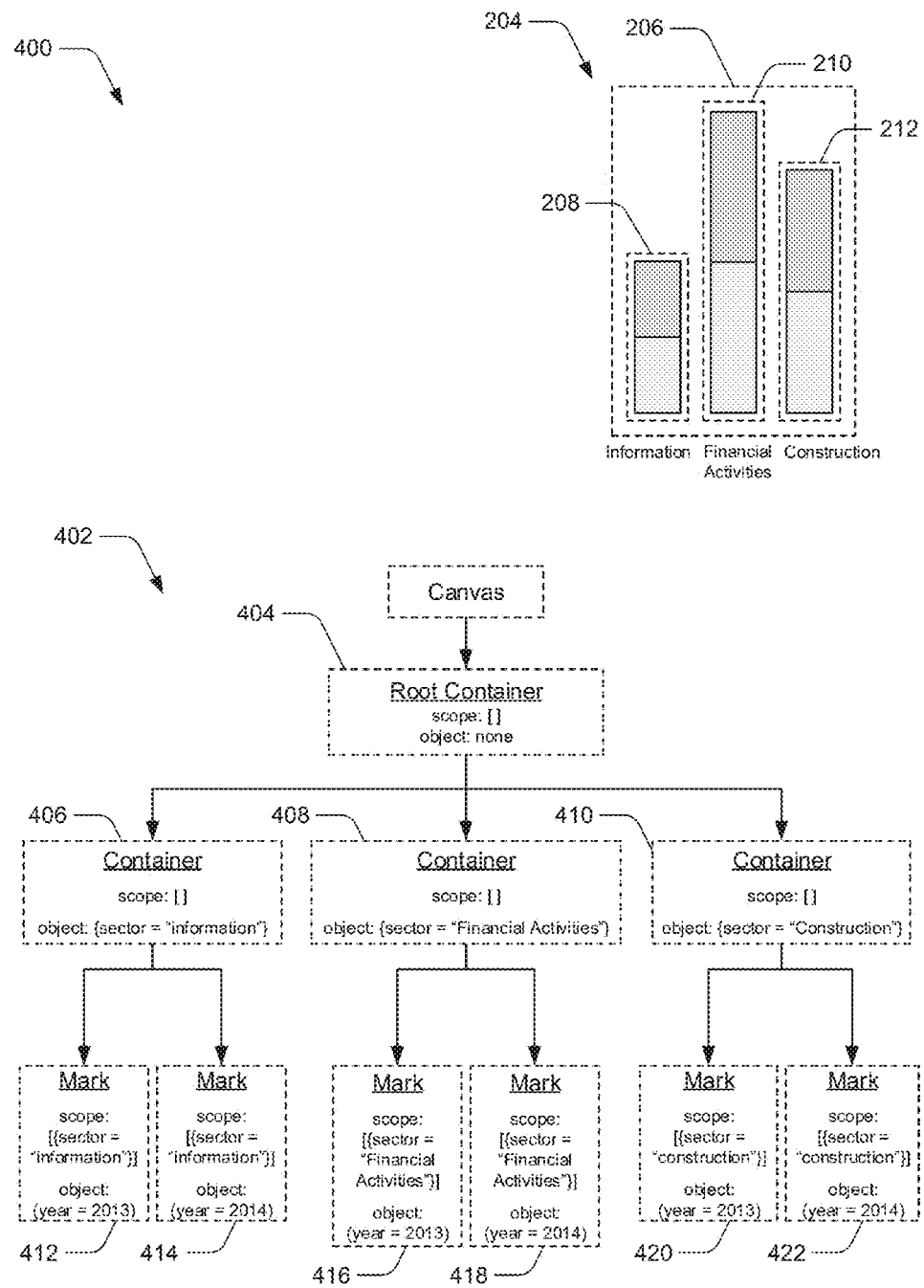
FIG. 4 depicts an example implementation that illustrates a scene graph of the visualization from FIG. 2 with annotations.

FIG. 4 depicts an example implementation 400 that illustrates a scene graph 402 of the visualization 204 from FIG. 2 with annotations. The illustrated scene graph 402 includes a root container 404 (corresponding to the exterior container representation 206 in visualization 204), containers 406-410 (corresponding to container representations 208-212 of the visualization 204), and visual marks 412-422 (corresponding to respective rectangles in the stacked bars of the visualization 204). In implementations, each item (e.g., container or visual mark) can be associated with various annotations, where the annotations jointly determine data values to be used in item creation and visual attribute binding. Example annotations of items can include object, scope, and batch.

The object of an item signifies what the item represents. Here, the object is a predicate specifying a column name and column value. For example, in FIG. 4, the object of the three children containers 402-406 are Sector values from Table 1. In addition, the scope of an item is a list of predicates defining filtering operations applicable to the item. Here, the scope of any item i is the conjunction of the scope and object of its parent p, as defined in the following equation:

$$\text{scope}(i) = \text{scope}(p) \cup \{\text{object}(p)\} \quad \text{Equation 1}$$

In the illustrated example, both the scope and object of the root container 404 is an empty list, implying that all data cases should be included. The scope of the three children containers 406-410 is also an empty list, and their object is associated with the Sector values from Table 1. In addition, the scope of each visual mark 412-422 is jointly determined by its parent container's scope and object. In at least one approach, each item includes a batch number assigned during creation of the item. The batch number can be useful for selecting multiple items during iterative data binding and update.

For data-driven item creation and removal, various operators can be used, such as populate and duplicate operators. In implementations, the populate operator can be used to generate visual items based on categorical variables, while the duplicate operator can be used to create visual items based on quantitative variables. Categorical variables are qualitative variables that can represent various categories of information, such as names or labels. In contrast, quantitative variables are numerical and can represent measurable (e.g., quantifiable) data values. Further discussion of these operators and annotations is provided below in more detail with respect to FIG. 5.

Figure 5:
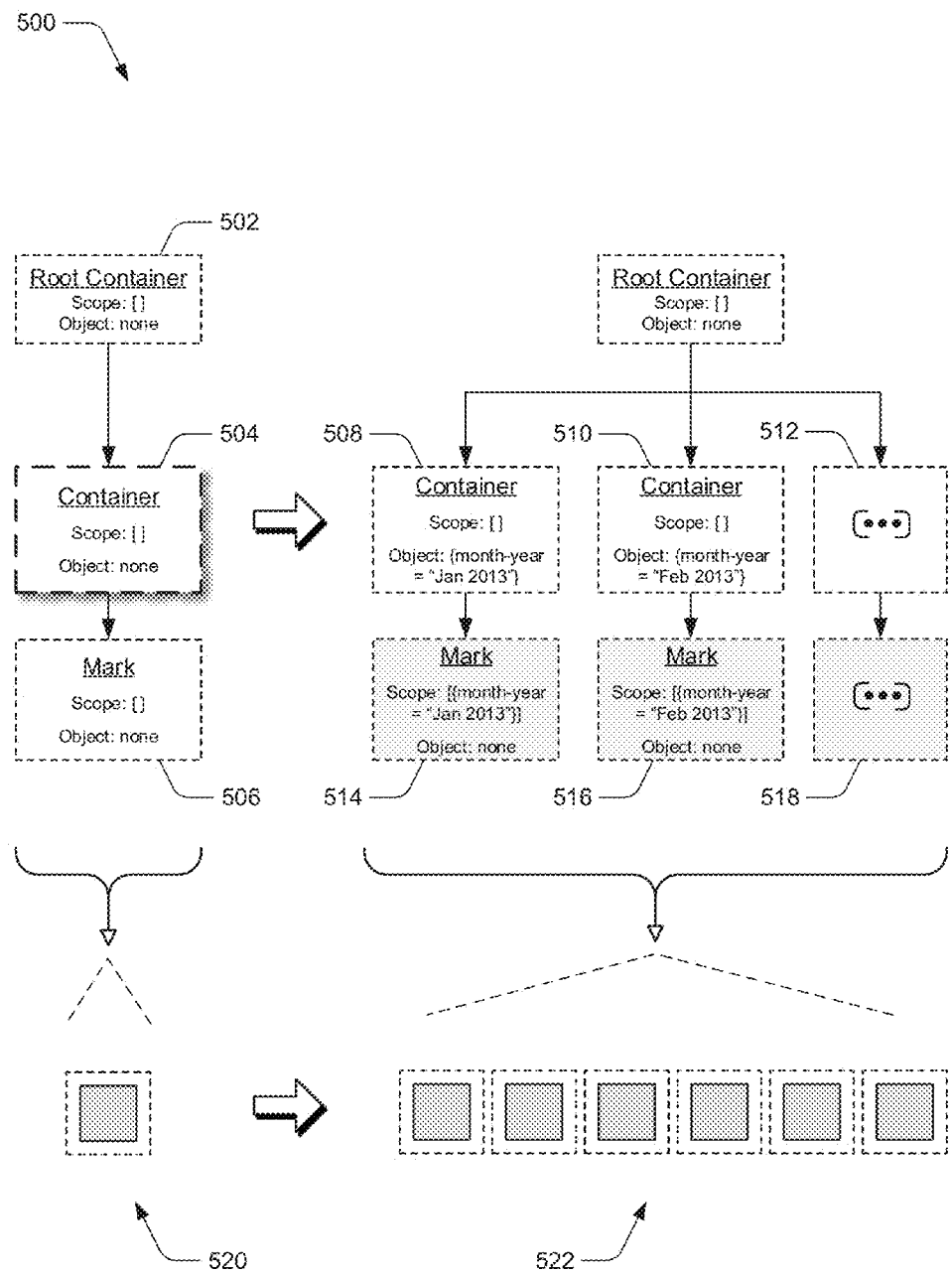
FIG. 5 illustrates an example implementation of interactive scene graph manipulation in accordance with one or more embodiments.

FIG. 5 illustrates an example implementation 500 of interactive scene graph manipulation in accordance with one or more embodiments. In the illustrated example, a populate operator is executed on a selected container in a scene graph. As illustrated, the scene graph includes a root container 502, a selected container 504, and a mark 506. In implementations, a populate operator can generate visual items based on selected item prototypes, and can assign values of a categorical variable as their object. The data values to be bound to the visual items are then determined by the scope of each selected item. For example, the container 504 can be populated by Month-Year from Table 1, using all the distinct month-year values in the dataset since the scope of the container 504 is empty. In implementations, the populate operator can append new containers as necessary, and clone all the descendants of the new containers. Then, the populate operator can assign each new container the Month-Year value as its object, and apply Equation 1 for all descendants of each new container such that the descendants inherit their parent's object as part of their scope.

For example, the container 504 is selected and is copied to initiate creation of containers 508-512. The object of container 508 is the value {month-year "Jan 2013"} from the dataset in Table 1, while the object of container 510 is the value {month-year "Feb 2013"} from the dataset. Additionally, container(s) 512 represents multiple containers that follow the pattern set forth by container 508 and 510 with respect to the Month-Year values in the dataset. In addition, each new container 508-512 includes a descendant having a scope inherited by its parent container. For example, mark 514 includes a scope having a value {month-year "Jan 2013"} that matches the object of its parent container 508, and mark 516 includes a scope having a value {month-year "Feb 2013"} that matches the object of its parent container 510. Mark(s) 518 represents multiple marks that follow the pattern set forth by marks 514 and 516 with respect to the inherited values from parent container(s) 512. Thus, using the techniques described herein, the descendants of an item prototype are cloned for newly generated items.

In addition, items populated by a variable at the same level of the scene graph are assigned the same batch number (illustrated as fill color). For example, the populated containers 508-512 are assigned the same batch number to cause them to belong to the same batch (e.g., grouping), and the marks 514-518 are assigned to another batch that is different than the containers' batch. In implementations, the batch number can be used to check whether new items are to be created or if leftover items are to be removed.

In at least one example, data visualization 520 is a visual representation of the scene graph before executing the populate operator. Data visualization 520 includes a dashed line that visually represents container 504, and a shaded square that visually represents mark 506. By applying the populate operator to the container 504, the data visualization 520 can be automatically modified to create data visualization 522 having new items corresponding to the new containers and associated child marks in the scene graph.

Figure 6:
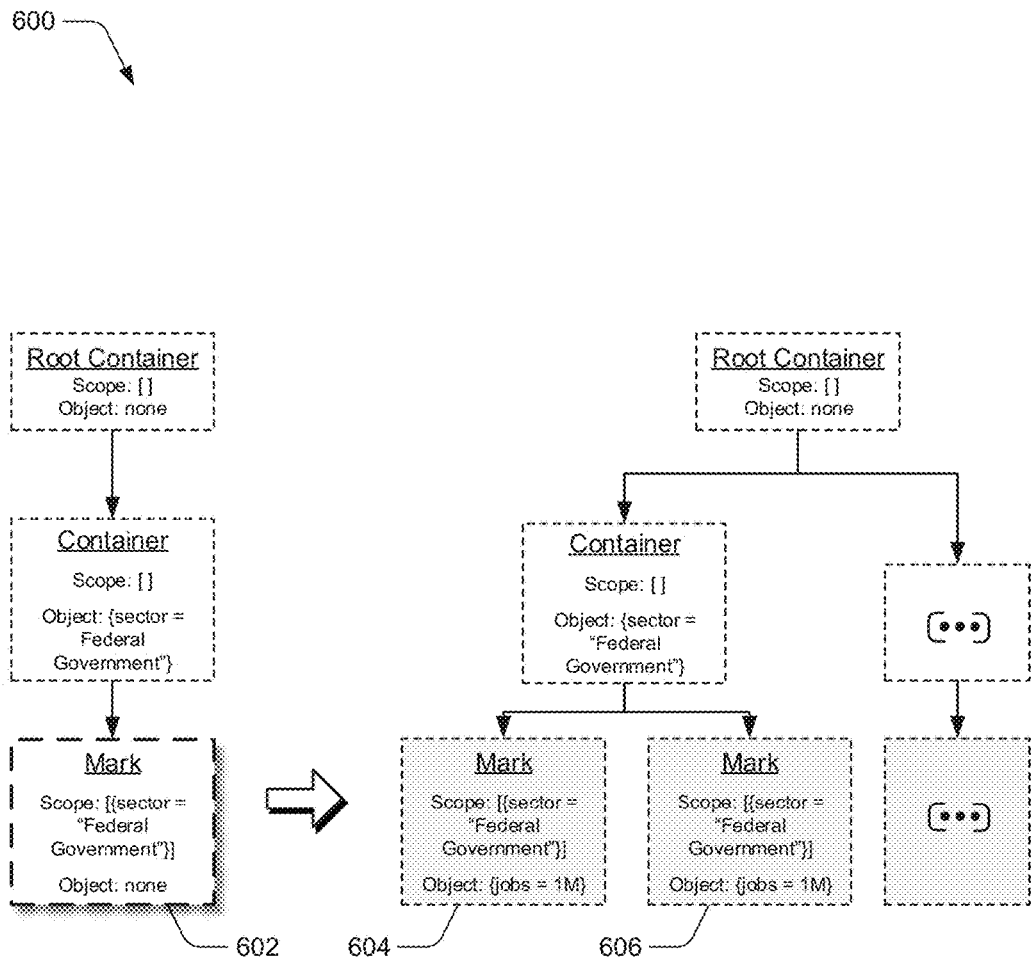
FIG. 6 illustrates is an example implementation of interactive scene graph manipulation in accordance with one or more embodiments.

FIG. 6 is an example implementation 600 of interactive scene graph manipulation in accordance with one or more embodiments. In the illustrated example, a duplicate operator is executed on a visual mark in a scene graph. The duplicate operator functions similarly to the populate operator, but on a quantitative variable. In implementations, the duplicate operator can be useful for generating ISOTYPE-style visualizations, where a quantity is represented by a number of copies of an item rather than by using a visual attribute. For example, in FIG. 6, the duplicate operator is applied to mark 602, and mark 602 represents Sectors of the dataset in Table 1. In the illustrated example, applying the duplicate operator to mark 602 initiates creation of new marks 604 and 606 that each represent the number of jobs for that sector (e.g., "Federal Government") in millions. In implementations, the duplicate operator can truncate the number when the variable value is not an integer. In addition, items duplicated by a variable at the same level of the scene graph are assigned the same batch number (illustrated by shading).

The batch number is a primary selector in the framework described herein. In addition, selectors can match visual items by a variety of different attributes, such as type (e.g., container or mark), shape (e.g., rectangle, circle, and so on), level in the scene graph, scope, object, containment (e.g., parent child relationship), and so on. In implementations, the scope of an item can contain predicates involving quantitative variables in the form of a filter. When a filter is applied to a container, all of that container's descendants inherit the filter. Further, the filtering predicate dictates the creation and removal of child items, similar to other predicates in the scope.

Figure 7:
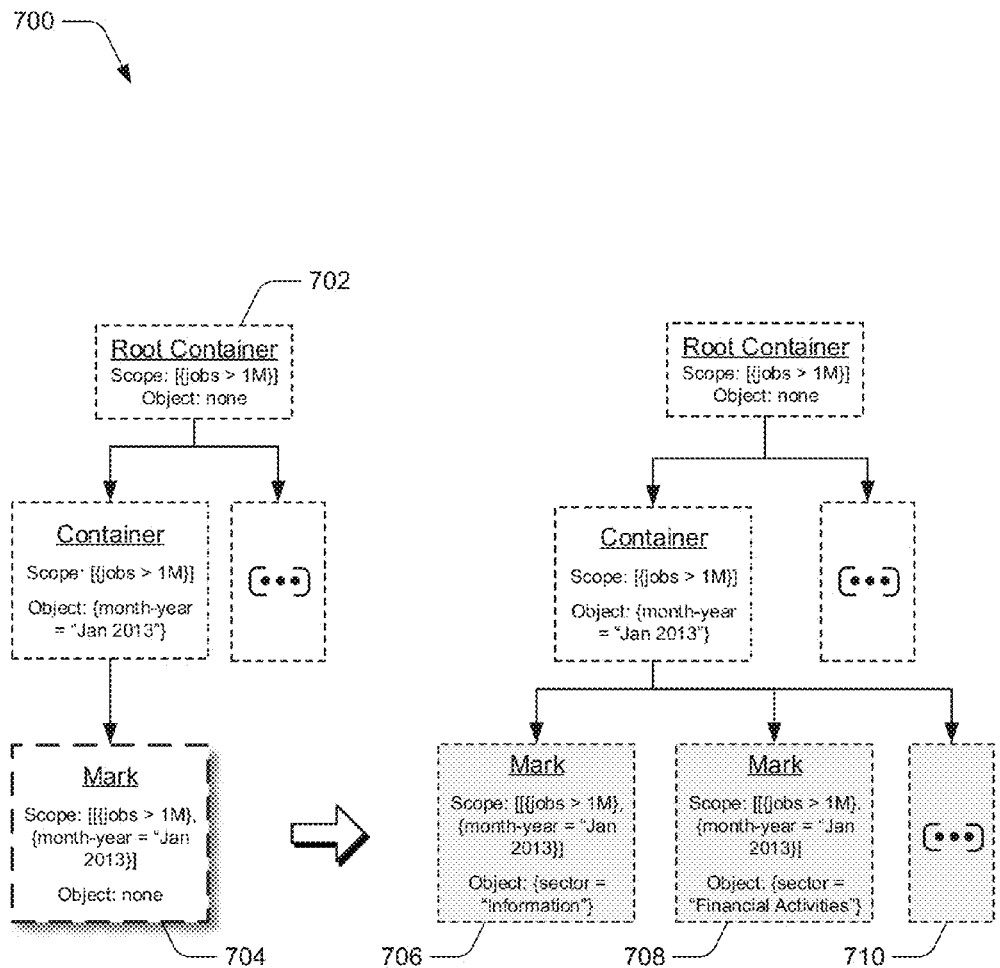
FIG. 7 illustrates an example implementation of interactive scene graph manipulation in accordance with one or more embodiments.

FIG. 7 illustrates an example implementation 700 of interactive scene graph manipulation in accordance with one or more embodiments. In the illustrated example, a filter (e.g., {jobs>1M}) is applied to root container 702 in accordance with the dataset in Table 1. With this filter in the scope of the root container 702, applying the populate operator to the mark 704 by Sector initiates the creation of only marks that represent sectors where the number of jobs is greater than 1 million in each month-year. Then, the batch number can be used to check if new items are to be created and/or if redundant existing items are to be removed.

The scope and object of an item jointly determine data values during data binding. In FIG. 7, for example, if a height of the new marks 706-710 are used to represent the total number of jobs, then the value assigned to each mark is the aggregated job number for sectors with over 1 million jobs in respective months.

Figure 8:
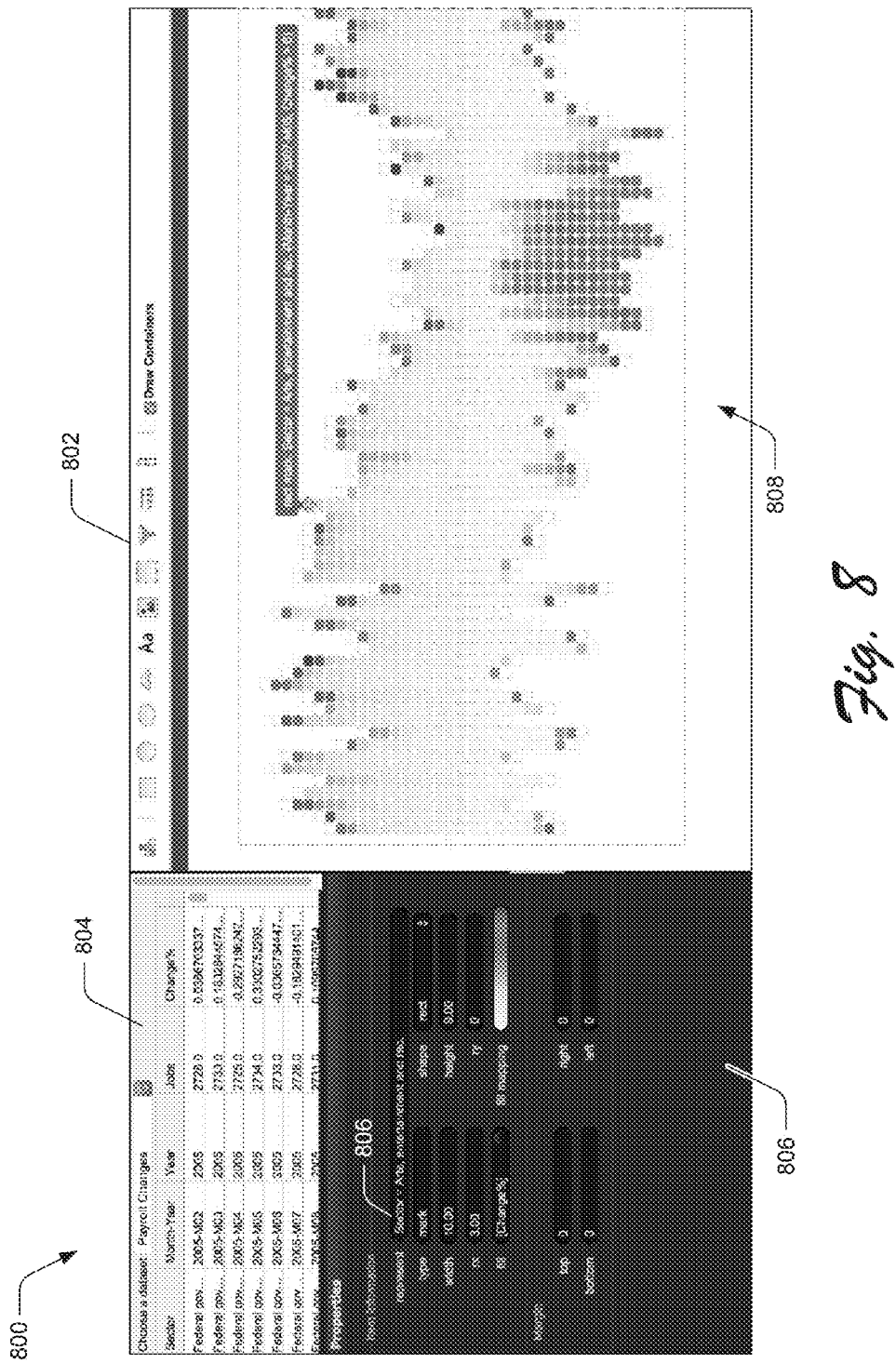
FIG. 8 illustrates an example implementation of a user interface that can be used for interactive scene graph manipulation for visualization authoring in accordance with one or more embodiments.

FIG. 8 illustrates an example implementation 800 of a user interface 802 that can be used for interactive scene graph manipulation for visualization authoring in accordance with one or more embodiments. In the illustrated example, the user interface 802 includes a variety of components, examples of which include a data view panel 804, a properties panel 806, and a canvas panel 808. In at least some embodiments, the canvas panel 808 includes a live canvas that updates whenever a user performs an operation. In implementations, animated transitions can be used to help users better understand the changes an operation brings to a visualization displayed in the canvas panel 808. In at least one example, a user can create items by dragging and dropping column names from the data view panel 802 to a data field displayed in the properties panel 804, thereby initiating data binding of data in the data view panel 804 with the items created for display via the canvas panel 808. Reconfiguration of the items displayed in the canvas panel 808 can be achieved through the combination of direct manipulation in the canvas panel 808 and/or controls in the properties panel 806.

In the illustrated example, representations of containers can be rendered in the canvas panel 808 as transparent shapes with a dashed border. Users can show or hide the representations of the containers by selecting a control in a toolbar, for example. In the user interface 802, the structure of the scene graph is implicitly represented. Alternatively, however, an explicit hierarchical representation of the scene graph can be displayed via the canvas panel 808, and interactive editing of the scene graph representation can be enabled. In at least one example, the scene graph representation can be juxtaposed with the visualization displayed via the canvas panel 808.

The properties panel 806 can display information of selected items (e.g., containers or marks). For example, selection of a container can initiate display of layout settings associated with the container. In at least one implementation, selection of an item can initiate automatic selection of all items belonging to the same batch. This can enable the user to quickly select an entire batch of items with a single input (e.g., click). In addition, an alternative input can be used to select a single item from a batch of items, such as via a double click, right click, and so on. Further, additional options to generalize selection can be made available via a context menu, such as a menu that lists selectable options that can be used to control the selection of visual marks. Thus, a variety of different user inputs can be used to make different selections of items displayed via the canvas panel 808.

The context menu can include a variety of additional operations. Some example operations can include adding a horizontal and/or a vertical axis, sorting visual marks in selected containers by a quantitative variable, aligning the visual marks inside selected charts, changing the shape of selected visual marks, changing the layout of selected containers, copying and pasting charts for customization, and so on. Thus, a variety of different operations can be made accessible via the context menu. Alternatively or additionally, these additional operations can be accessible via other features of the user interface 802, such as a toolbar, ribbon, pop-up window, and so on.

In implementations, the properties panel 806 can enable a user to modify the visual property settings of the selected items effective to reconfigure data visualizations displayed in the canvas panel 808. For example, the properties panel 806 can include various data fields representing visual property settings of selected items displayed in the canvas panel 808. At least one data field, such as data field 810, can show the object of selected items. In implementations, a user can drag and drop column names to the data field 810 to set the object of items. To ensure that the user understands what each item represents, a tooltip can appear showing the object and the scope of the item. The drag and drop operation can also be applied to data binding and filtering operations on an item's visual attributes such as width, height, fill color, and so on. In addition, a filtering predicate can be defined, for example, via a filter button in the toolbar. When the user drags and drops the predicate over a container, the filter is applied to all the children of that container, removing elements that do not satisfy the predicate and updating the scope of remaining elements.

To display visualizations via the canvas panel 808, sizes of the leaf nodes (e.g., visual marks) in the scene graph are calculated. In implementations where no data binding is applied to these nodes, then the nodes retain their size upon creation. However, when the data binding has been specified, the size is computed based on a global scale applicable across all levels of the scene graph. In addition, sizes of non-leaf containers can be determined, such as via a bottom-up pass, based on the size of their children as well as the layout associated with the container.

Once the sizes of the items in the scene graph are calculated, a position of each item can be determined in a top-down fashion. For example, x- and y-coordinates of an item can be determined by the location of its parent, the layout of its parent container, and its own relative position among all the children of the parent container.

Having discussed some example implementation scenarios, consider now a discussion of some example procedures in accordance with one or more implementations.

Example Procedures

The following discussion describes techniques for interactive scene graph manipulation for visualization authoring that may be implemented in any suitable environment, such as the environment 100 for example. Aspects of each of the procedures may be implemented in hardware, firmware, or software, or a combination thereof. In at least some implementations, the procedures describe example ways for performing various aspects of the implementations discussed above. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
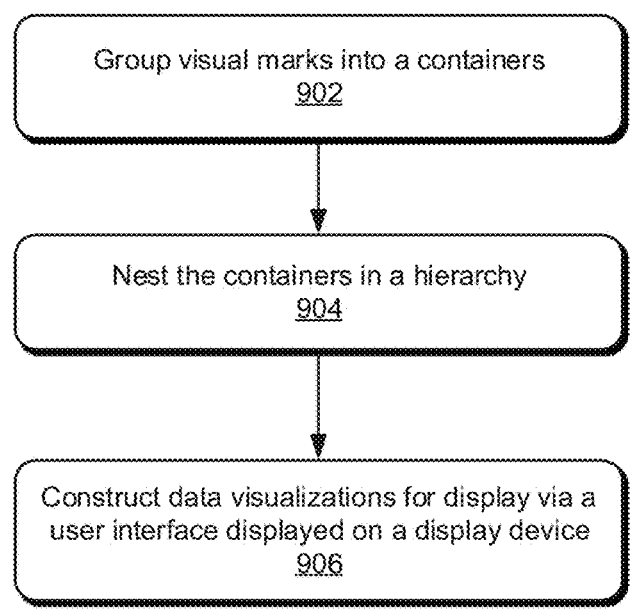
FIG. 9 is a flow diagram depicting a procedure in an example implementation in which techniques for interactive scene graph manipulation for visualization authoring are described.

FIG. 9 is a flow diagram depicting a procedure 900 in an example implementation in which techniques for interactive scene graph manipulation for visualization authoring are described. Visual marks are grouped into containers (block 902). For example, a visual mark (e.g., rectangle) can be dragged and dropped onto a visual representation of a container displayed on a display device to associate the visual mark with the container. In implementations, each includes layout settings independent of other containers. Further, the layout settings of each container are individually adjustable.

The containers are nested in a hierarchy (block 904). This step can be performed in any suitable way, examples of which are described above such as with reference to FIG. 3. Data visualizations are constructed for display via a user interface on a display device (block 906). In implementations, the data visualizations are constructed by applying data values to the visual marks and applying layout settings of the nested containers to visual marks grouped within the nested containers. For example, the layout settings of a particular container are applied to child items of that container, such as child containers or child visual marks. The child containers or marks can be positioned and oriented based on those layout settings. In addition, the data values are applied to the visual marks to determine various attributes of the visual marks, such as for example size or color. In addition, the data visualizations can be reconfigured subsequent to construction of the data visualizations by at least modifying one or more of layout settings of at least one selected container or visual properties of at least one selected visual mark. For example, responsive to an indication of a user selection of a populate operator on a selected container, one or more new containers can be automatically appended based on the data values, and descendants of the new containers can be cloned to generate the data visualization based on one or more descendants of the selected container. In implementations, an indication of a user selection of one or more of the plurality of containers is received, and responsive to the indication, a display of layout settings associated with selected containers is initiated.

Figure 10:
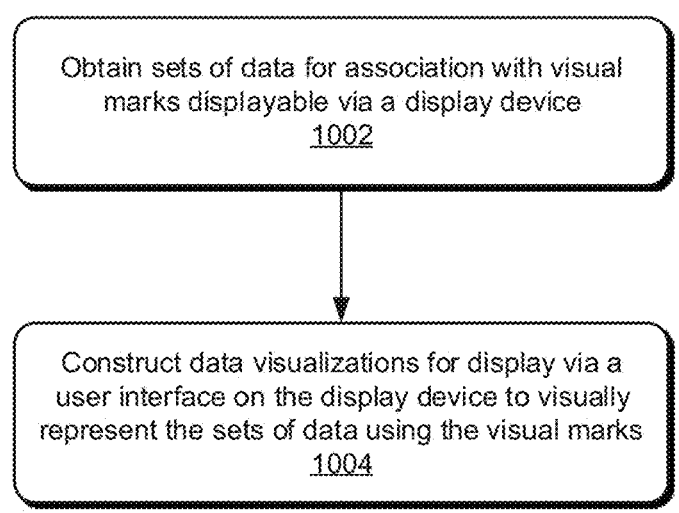
FIG. 10 is a flow diagram depicting a procedure in an example implementation in which techniques for interactive scene graph manipulation for visualization authoring are described.

FIG. 10 is a flow diagram depicting a procedure 1000 in an example implementation in which techniques for interactive scene graph manipulation for visualization authoring are described. Sets of data are obtained for association with visual marks displayable via a display device (block 1002). In implementations, the visual marks are grouped within containers that are nested within a hierarchy. In addition, the containers each include layout settings independent of other containers.

Data visualizations are constructed for display via a user interface displayed on the display device to visually represent the sets of data using the visual marks (block 1004). In implementations, the data visualizations are constructed by applying the layout settings of the containers and the sets of data to the visualizations. In addition, the user interface can allow direct manipulation of the displayed visual marks. Further examples of this step are described above.

Example System and Device

Figure 11:
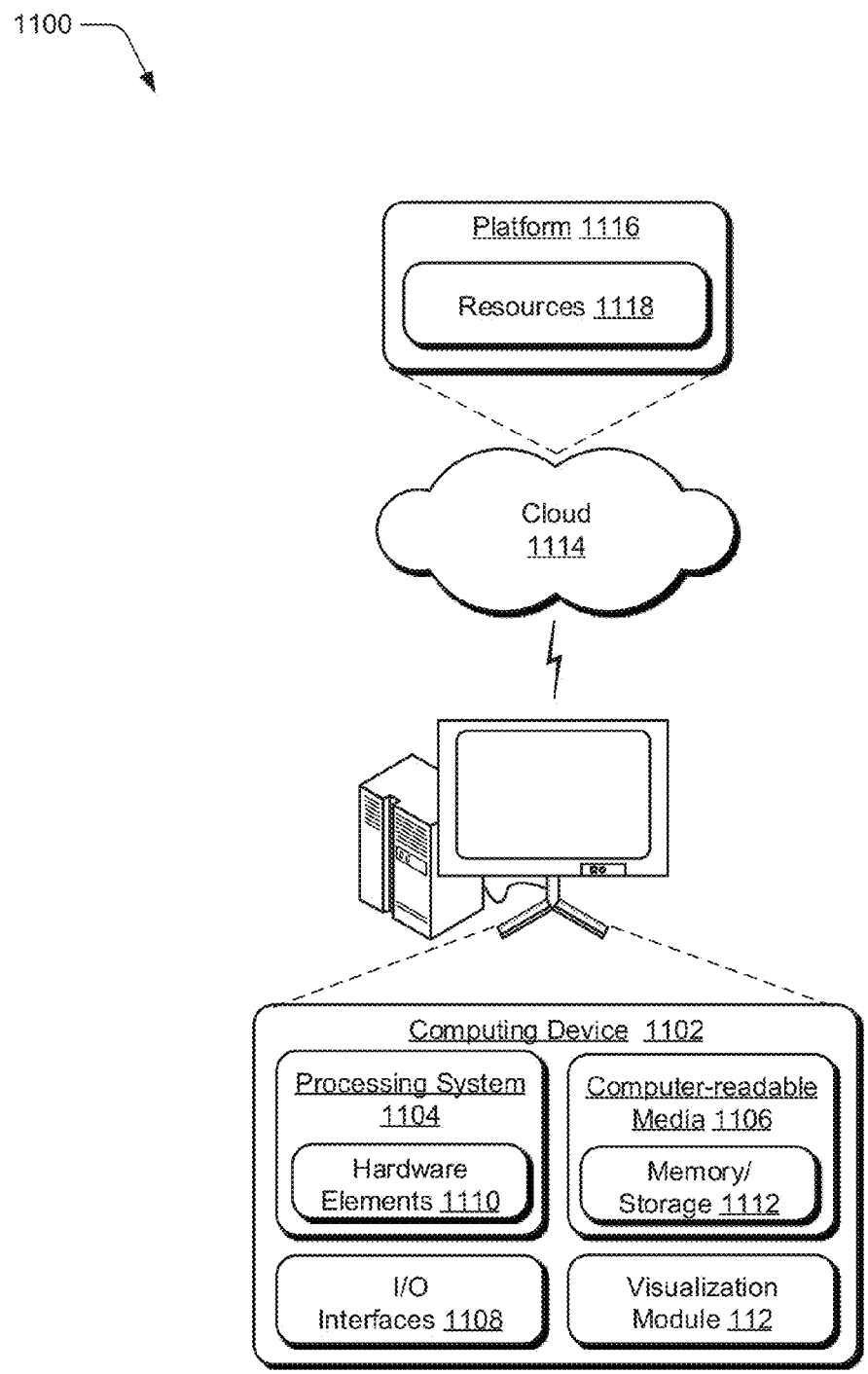
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the visualization module 112. The visualization module configured to manage creation and manipulation of visualizations using a nested container framework. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method to enable interactive scene graph manipulation and visualization authoring, the method comprising:
grouping, into each of a plurality of containers, a respective subset of a plurality of visual marks each of the plurality of containers associated with one or more layout settings that are independent of layout settings of others of the plurality of containers;
associating each of the plurality of containers with a categorical variable that identifies a category of data values of a set of data values; and
constructing data visualizations for the set of data values for display via a user interface of a display device, said constructing including:
applying one or more data values of one category of data values identified by one categorical variable of one container of the plurality of containers to one or more visual properties of one subset of the plurality of visual marks grouped into the one container, and
applying layout settings of the one container to the one subset of the plurality of visual marks.

2. A method as described in claim 1, further comprising nesting a subset of the plurality of containers into a parent container, the subset of the plurality of containers configured to inherit at least one property of the parent container.

3. A method as described in claim 1, wherein each of the plurality of containers includes a set of annotations that include scope, object, and batch, wherein the scope is usable to define filtering operations applicable to an individual container and an associated subset of visual marks, the object indicates an individual categorical variable of the individual container, and the batch identifies a group of containers that includes the individual container.

4. A method as described in claim 1, wherein the user interface is configured to allow direct manipulation of the plurality of visual marks.

5. A method as described in claim 1, wherein each container of the plurality of containers includes visual properties to be applied to respective visual representations of the plurality of containers, the visual properties including at least one of a width, a height, a shape, fill, margin, and padding.

6. A method as described in claim 1, further comprising reconfiguring the data visualizations subsequent to construction of the data visualizations by at least modifying at least one of the layout settings of at least one container of the plurality of containers.

7. A method as described in claim 1, further comprising reconfiguring the data visualizations subsequent to construction of the data visualizations by at least modifying visual properties of at least one visual mark.

8. A method as described in claim 1, further comprising:
responsive to an indication of a user selection of a populate operator on a container from the plurality of containers, automatically creating at least one new container to add to the plurality of containers, and assigning a new categorical variable to the at least one new container based on an assigned categorical variable of the container; and
generating at least one descendant of the at least one new container by replicating at least one descendant of the container, and assigning the at least one replicated descendant a value based on the new categorical variable assigned to the at least one new container.

9. A method as described in claim 1, further comprising:
receiving an indication of a user selection of at least one of the plurality of containers; and
responsive to receiving the indication, initiating a display of layout settings associated with the selected at least one of the plurality of containers.

10. A computing device comprising:
at least one processor;
at least one non-transitory computer-readable media storing instructions that are executable by the at least one processor to implement a user interface to enable interactive scene graph manipulation and visualization authoring, the user interface comprising:
- a data view panel configured to display at least a portion of at least one set of data;
- a canvas panel configured to display visual marks during construction of at least one data visualization, the visual marks representing the at least one set of data, the visual marks being associated with containers; and
- a properties panel configured to:
  - display one or more data fields associated with at least one container of the containers, the one or more data fields specifying one or more layout settings and an object of the at least one container, the object describing which data values of the at least one set of data values are represented by one or more visual marks associated with the at least one container,
  - display visual property settings of the visual marks displayed in the canvas panel, one or more of the visual property settings comprising a data value of the at least one set of data values selected based on the object of the at least one container, and
  - enable a user to reconfigure the at least one data visualization displayed in the canvas panel by modifying the one or more data fields or the visual property settings displayed in the properties panel.

11. A user interface as described in claim 10, wherein layout settings of a different container are independent of the one or more layout settings of the at least one container to enable the different container to have different layout settings from the one or more layout settings.

12. A computing device as described in claim 10, wherein the containers each include a margin property that is adjustable independently from other containers in the property panel.

13. A computing device as described in claim 10, wherein the properties panel is further configured to receive an input of a column name from the data view panel to set at least one of the displayed visual property settings, the input comprising a drag and drop operation of the column name to the at least one of the displayed visual property settings.

14. A computing device as described in claim 10, wherein the visual marks are generated based on at least one of categorical variables and quantitative variables inherited from an associated container, the categorical variables represent categories of information from the data, and the quantitative variables represent measurable data values from the data.

15. A computing device as described in claim 10, wherein the visual property settings include at least one of a width, a height, a shape, fill, margin, and padding, to be applied to at least one visual mark.

16. A system, implemented in at least one computing device, to enable interactive scene graph manipulation and visualization authoring, the system comprising:
- at least one processor;
- at least one non-transitory computer-readable media storing instructions that are executable by the at least one processor to implement a visualization tool configured to perform operations to reconfigure scene graphs and construct visualizations, the operations including:
  - obtaining at least one set of data to be visually represented by a plurality of visual marks displayable via a display device;
  - grouping the plurality of visual marks into containers, the containers each comprising a group of the plurality of visual marks, one or more annotations specifying data values to be represented by the group of the plurality of visual marks, and one or more layout settings for the group of the plurality visual marks; and
  - constructing data visualizations for display via a user interface to visually represent the at least one set of data using the plurality of visual marks, said constructing including:
    - applying layout settings of one container to one group of the plurality of visual marks grouped into the one container, and
    - applying one or more data values of the at least one set of data to one or more visual properties of the one group of the plurality of visual marks based on an annotation of the one container specifying the one or more data values.

17. A system as described in claim 16, wherein each of the plurality of containers includes annotations that include at least one of scope, object, and batch, wherein the scope is usable to define filtering operations applicable to an individual container, the object indicates content that the individual container represents, and the batch identifies a group of containers that includes the individual container.

18. A system as described in claim 16, wherein the user interface is displayed to allow direct manipulation of at least one of the plurality of visual marks.

19. A system as described in claim 16, wherein the operations further include initiating display of the data visualizations via the user interface on the display device.

20. A system as described in claim 16, wherein at least one container is a parent container that includes at least one child container or child visual mark, the at least one child container or child visual mark configured to inherit at least one visual property setting of the parent container.

* * * * *